United States Patent
Menke et al.

(10) Patent No.: US 9,206,773 B2
(45) Date of Patent: Dec. 8, 2015

(54) FUEL SYSTEM

(75) Inventors: Andreas Menke, Tiefenbronn-Lehningen (DE); Josef Oesterle, Muehlacker (DE); Horst Petri, Weil der Stadt (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 743 days.

(21) Appl. No.: 13/439,238

(22) Filed: Apr. 4, 2012

(65) Prior Publication Data

US 2012/0260892 A1 Oct. 18, 2012

(30) Foreign Application Priority Data

Apr. 13, 2011 (DE) .................. 10 2011 002 021

(51) Int. Cl.
 *F02M 25/08* (2006.01)
 *B60K 15/035* (2006.01)
 *F02M 37/20* (2006.01)

(52) U.S. Cl.
 CPC ........ *F02M 25/089* (2013.01); *B60K 15/03519* (2013.01); *B60K 2015/03509* (2013.01); *B60K 2015/03514* (2013.01); *F02M 37/20* (2013.01)

(58) Field of Classification Search
 CPC ... F02M 37/20; F02M 25/08; F02M 25/0836; F02M 25/0872; F02M 25/089; B60K 2015/03509; B60K 2015/03514; B60K 2015/03519
 USPC .................. 123/514, 516, 518, 519, 520, 521
 See application file for complete search history.

(56) References Cited

U.S. PATENT DOCUMENTS

| | | | |
|---|---|---|---|
| 5,881,700 A | 3/1999 | Gras et al. | |
| 5,957,113 A * | 9/1999 | Masaki et al. | 123/518 |
| 6,176,259 B1 * | 1/2001 | Harde et al. | 137/587 |
| 6,526,950 B2 | 3/2003 | Ito et al. | |
| 6,772,740 B2 * | 8/2004 | Kojima et al. | 123/519 |
| 6,786,207 B2 * | 9/2004 | Kojima et al. | 123/516 |
| 7,261,092 B1 * | 8/2007 | Oku et al. | 123/516 |
| 8,327,830 B2 * | 12/2012 | Makino et al. | 123/518 |
| 8,474,439 B2 * | 7/2013 | Makino et al. | 123/516 |
| 8,713,994 B2 * | 5/2014 | Makino | 73/49.7 |
| 2001/0052292 A1 * | 12/2001 | Ito | 96/134 |
| 2003/0196645 A1 * | 10/2003 | Kojima et al. | 123/520 |
| 2004/0000352 A1 * | 1/2004 | Kojima et al. | 141/45 |
| 2010/0107877 A1 * | 5/2010 | Suzuki et al. | 96/6 |
| 2010/0288021 A1 * | 11/2010 | Makino et al. | 73/40.7 |
| 2010/0294251 A1 * | 11/2010 | Makino et al. | 123/519 |

(Continued)

FOREIGN PATENT DOCUMENTS

| | | |
|---|---|---|
| DE | 197 20 893 | 12/1997 |
| DE | 196 39 116 | 3/1998 |

(Continued)

*Primary Examiner* — Hieu T Vo
*Assistant Examiner* — Sherman Manley
(74) *Attorney, Agent, or Firm* — Gerald E. Hespos; Michael J. Porco; Matthew T. Hespos

(57) ABSTRACT

A fuel system (1*a*, 1*b*, 1*c*, 1*d*, 1*e*, 1*f*) for a motor vehicle internal combustion engine, having a fuel tank (2) with a fuel vapor venting path (4) containing an activated carbon filter (3), in which a fresh air stream (7) blown or sucked in the direction of the tank venting valve (6) by an independent pump unit (5) arranged close to the activated carbon filter (3) can be made to flow through the activated carbon filter (3), at least at the periphery thereof and, in that case, preferably at the fresh air side to regenerate said filter.

8 Claims, 6 Drawing Sheets

(56) References Cited

U.S. PATENT DOCUMENTS

2011/0146491 A1* 6/2011 Suefuji et al. .................. 96/8
2011/0214646 A1* 9/2011 Makino ........................ 123/518
2011/0247595 A1* 10/2011 Ogita et al. .................. 123/521
2012/0152209 A1* 6/2012 Menke ......................... 123/518

FOREIGN PATENT DOCUMENTS

| DE | 198 13 321 | 10/1999 |
| DE | 199 44 388 | 3/2001 |
| GB | 2 329 218 | 3/1999 |
| JP | 2002-122046 | 4/2002 |

* cited by examiner

FUEL SYSTEM

CROSS REFERENCE TO RELATED APPLICATION

This application claims priority under 35 USC 119 to German Patent Appl. No. 10 2011 002 021.7 filed on Apr. 13, 2011, the entire disclosure of which is incorporated herein by reference.

BACKGROUND OF THE INVENTION

1. Field of the Invention

The invention relates to a fuel system for a motor vehicle internal combustion engine.

2. Description of the Related Art

Almost all vehicles have a temporary store for hydrocarbons installed in a tank vent between the fuel tank and the environment. This temporary store typically is an activated carbon filter (ACF) that is regenerated by an air stream and is controlled by the engine electronics. During this process, air is passed via the hydrocarbon-laden particles to produce a hydrocarbon-laden air stream that is carried to the engine. The hydrocarbon-laden air stream coming from the activated carbon filter then is mixed with the combustion air and burned. Vehicles that have hybrid drive often utilize electric operation and hence eliminate a number of purging phases, including phases in the regulation driving profiles. Plug-in hybrids can travel under electric power for long distances, including entire driving cycles of the regulation tests, and therefore eliminate significant proportions of the purging cycle. The activated carbon filter should nevertheless be purged to comply with legal emissions limits.

DE 199 44 388 A1 relates to an apparatus for quickly heating up a pollutant catalyst in a motor vehicle that has an internal combustion engine and a fuel tank. More particularly, fuel constituents that have volatilized out of the fuel supply in the fuel tank are carried by air to the catalyst. The air stream enriched with the volatilized fuel constituents is fed to the catalyst and the volatilized fuel constituents are burned in a burner that is integrated into the inlet side of the catalyst.

JP 2002122046 A discloses a membrane interposed in the tank vent to separate the escaping gas mixture into an air-rich component and a fuel-rich component. The fuel-rich component is liquefied again in a cooler and fed back to the tank.

It is the object of the invention to provide a fuel system that is improved with respect to environmental pollution.

SUMMARY OF THE INVENTION

The invention relates to a fuel system for a motor vehicle internal combustion engine. The fuel system has a fuel tank with a fuel vapor venting path that contains an activated carbon filter. An independent pump unit is arranged close to the activated carbon filter and produces a fresh air stream that is blown or sucked in the direction of the tank venting valve and flows through at least the periphery of the activated carbon filter, preferably at the fresh air side, to regenerate said filter.

A condenser unit may be arranged downstream of the activated carbon filter. The mixture of air and fuel vapor from the activated carbon filter can be cooled in the condenser and the fuel fraction can be removed by condensation. In this way, it is possible to achieve effective condensation of the fuel vapors and effective cooling of the fuel.

A pump unit preferably is arranged as a compressor on the fresh air side of the activated carbon filter and/or as a suction device on the internal combustion engine side, between the radiator of the internal combustion engine and the activated carbon filter. The pump blows/sucks a fresh air stream through at least part of the activated carbon filter into the purging path and toward the tank venting valve (regeneration valve). This air is passed via a condenser where the mixture of air and fuel vapor is cooled, and the fuel fraction is condensed out of the gas stream.

The volume flow of the pump unit preferably is made to depend on state variables relevant to the regeneration of the activated carbon filter, this dependence being used for open-loop or closed-loop control.

The pump unit can have a power rating of about 50-100 watts, for example, and can be installed at an appropriate point in the vehicle, in particular as a compressor on the fresh air side of the activated carbon filter or as a suction pump on the engine side, between the activated carbon filter and the radiator, or can be integrated into the fuel tank.

The heater can be an intrinsically safe system, preferably a PTC element, with a heat output of about 100° C. The heater also could be integrated into some other component, e.g. the activated carbon filter.

Examples of operating modes/applications of the fuel system and the pump unit include: application to a hybrid drive with activation of the pump unit in stoppage phases of the internal combustion engine; activation of the pump unit while the vehicle is in operation and when the vehicle is stationary; and/or activation of the pump unit only when the vehicle is stationary or only when the vehicle is in operation. Other examples of operating options include: the pump unit is used only during electrically powered driving to purge the activated carbon filter; the pump unit is switched off when the activated carbon filter has been purged sufficiently (thus being dependent on loading); and/or the pump unit is switched on only when the activated carbon filter exceeds a certain loading (thus being dependent on loading to avoid or delay penetration of the activated carbon filter).

A combined valve may be provided for connecting up the blowers or shutting off the tank vent. The time in use and/or the beginning (end) of operation of the pump unit can be dependent on sensors, e.g. a sensor in the tank system, a tank pressure sensor, a fuel temperature sensor, a sensor in the venting system, e.g. an HC sensor, a pressure pick-up, a sensor in the activated carbon filter or a sensor for the temperature, delta P or the state of loading of the activated carbon filter, for example. Moreover, allowance can be made for the fuel level in the vehicle tank.

A temporary store for the condensed fuel fraction from the condenser can be provided in the return line unit to the fuel tank.

Provision can be made for the condensed fuel fraction to be returned to the fuel tank. The fuel can thus be drained off directly (gravimetrically) or with a temporary store or a store with an emptying device.

A pump unit that uses an electric pump with only relative sealing, such as a vane cell pump, can be provided. A rotary slide pump or vane cell pump is a positive displacement pump for gases and liquids for suction and pressure applications and generally has a hollow cylinder (stator), in which another cylinder (rotor) rotates. The axis of rotation of the rotor is arranged eccentrically with respect to the stator, and the rotor is in contact with the inner wall of the stator between the inlet and outlet opening. This location is then the point of separation between the suction and the pressure space.

Further advantages, features and details of the invention will emerge from the following description, in which illustrative embodiments of the invention are described with reference to the drawings. At the same time, the features mentioned in the claims and in the description may each be essential to the invention individually or in any combination.

The invention is explained in greater detail below with reference to the drawings. The figures are described together and in an overarching manner. Identical reference signs refer to identical components, while reference signs with different indices indicate components that are functionally identical or similar.

DETAILED DESCRIPTION OF THE PREFERRED EMBODIMENTS

Figure 1:
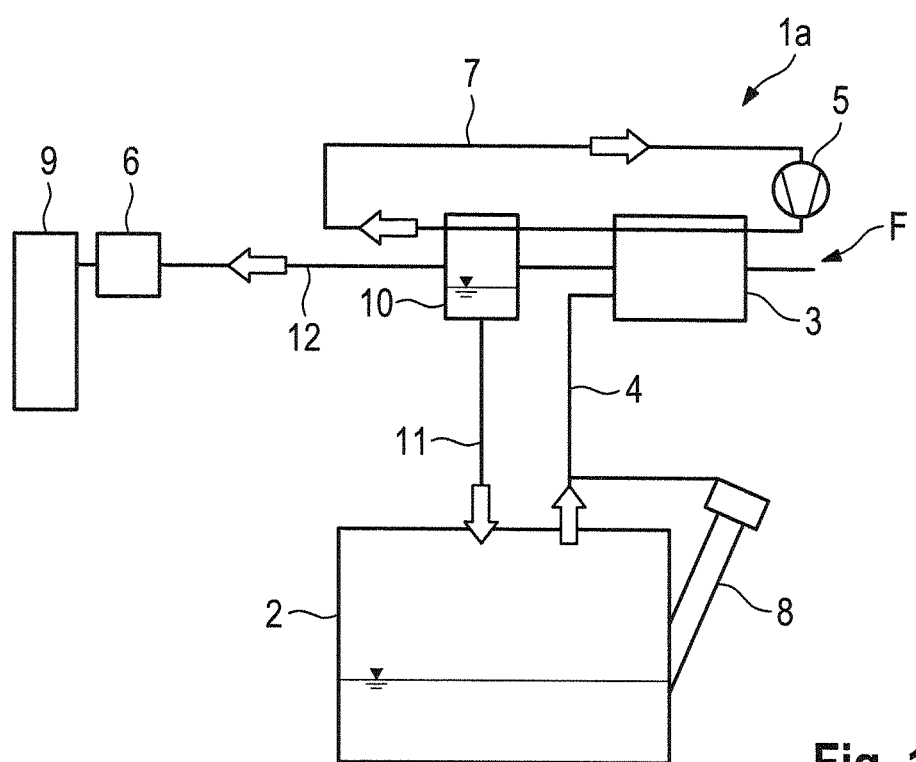
FIG. 1 is a schematic circuit diagram of a first illustrative embodiment of the fuel system according to the invention.

FIG. 1 is a schematic circuit diagram of a fuel system 1a of a passenger car. The fuel system 1 for a motor vehicle internal combustion engine comprises a fuel tank 2 with a fuel vapor venting path 4 containing an activated carbon filter 3. An independent pump unit 5 is arranged close to the activated carbon filter 3 and can blow a fresh air stream 7 through the activated carbon filter 3 and in the direction of the tank venting valve 6 to regenerate said filter.

The fuel system 1 further includes a tank filler neck 8, an engine 9 and a condenser 10. A return line 11 runs from the condenser 10 to the fuel tank 2 and the condensed fuel fraction is returned to the fuel tank 2 via the return line 11.

The pump unit 5 is arranged close to (ahead of) the activated carbon filter 3 and blows the fresh air stream 7 through the activated carbon filter 3, or a part thereof, into the purging path 12 and in the direction of the tank venting valve (regeneration valve) 6. This fresh air stream 7 is passed via the condenser 10 where the mixture of air and hydrocarbon vapor is cooled, the fuel fraction is condensed out of the gas stream, and the condensate is returned to the fuel tank 2. In this arrangement, the pump unit 5 is essentially a compressor on the fresh air side F of the activated carbon filter 3.

Figure 2:
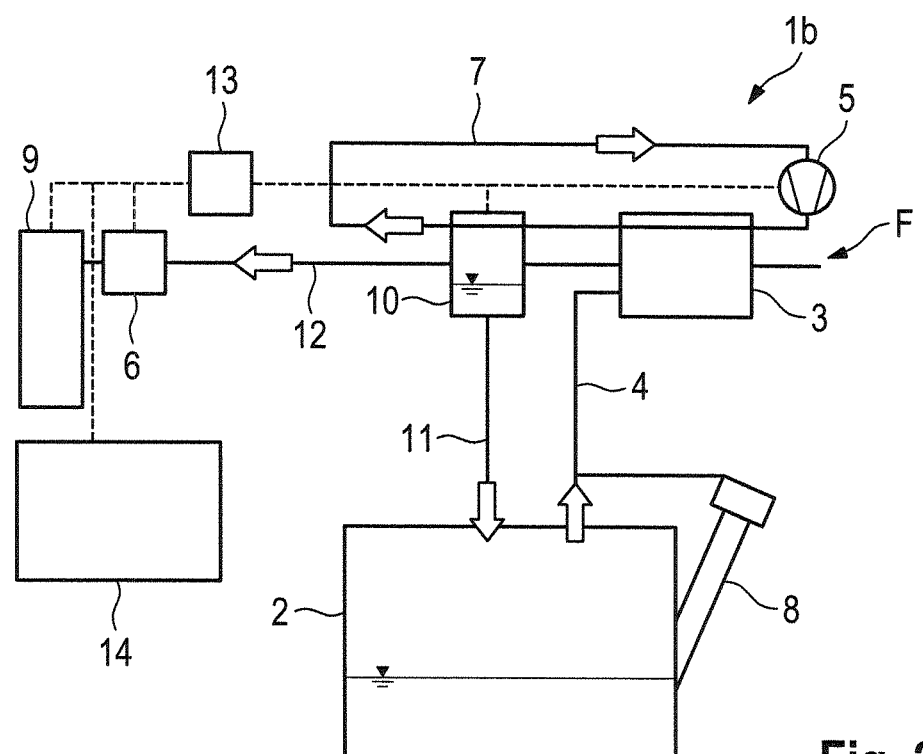
FIG. 2 is a schematic circuit diagram of a second illustrative embodiment of the fuel system according to the invention.

A fuel system 1b in accordance with a second embodiment is illustrated in FIG. 2. A control unit 13 and a sensor arrangement 14 are integrated into the fuel system 1b. The arrangement 14 can comprise a plurality of vehicle-specific sensors. The control unit 13 is connected to the pump unit 5, the condenser 10, the tank venting valve 6, the engine 9 and the sensor arrangement 14. In other respects, the fuel system 1b shown in FIG. 2 corresponds essentially to the fuel system 1a shown in FIG. 1.

Figure 3:
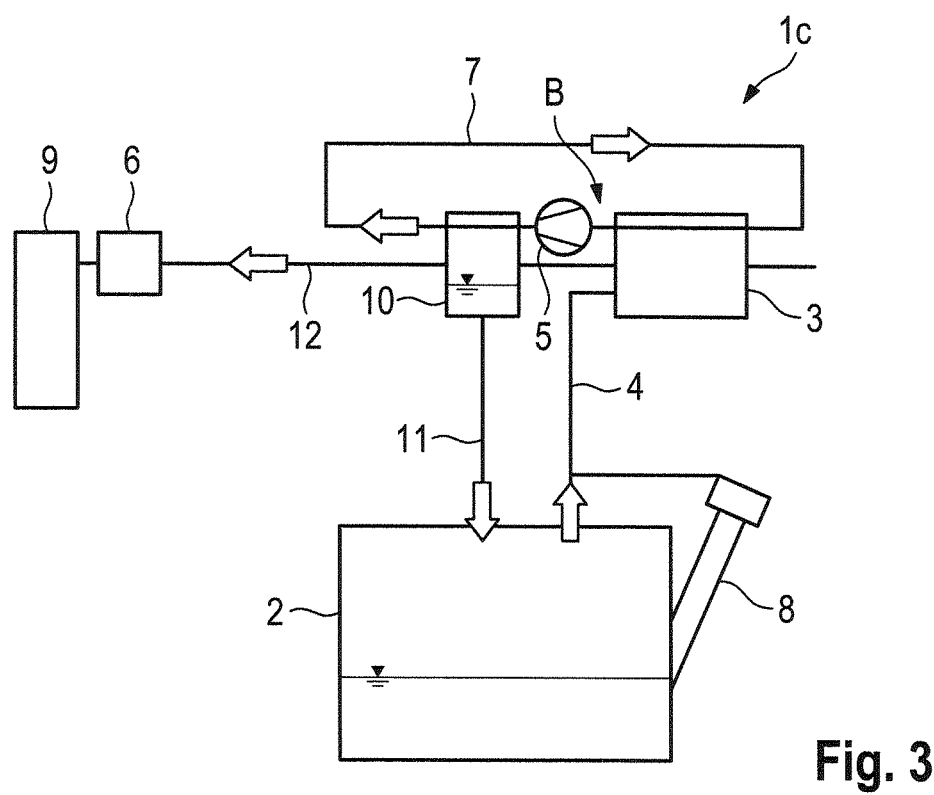
FIG. 3 is a schematic circuit diagram of a third illustrative embodiment of the fuel system according to the invention.

FIG. 3 shows a fuel system 1c in which the pump unit 5 is arranged between the activated carbon filter 3 and the condenser 10. In other respects, the fuel system 1c shown in FIG. 3 corresponds to the construction of the fuel system 1a shown in FIG. 1. The pump unit 5 thus is arranged essentially as a suction device on the internal combustion engine side B, between the condenser 10 and the activated carbon filter 3.

Figure 4:
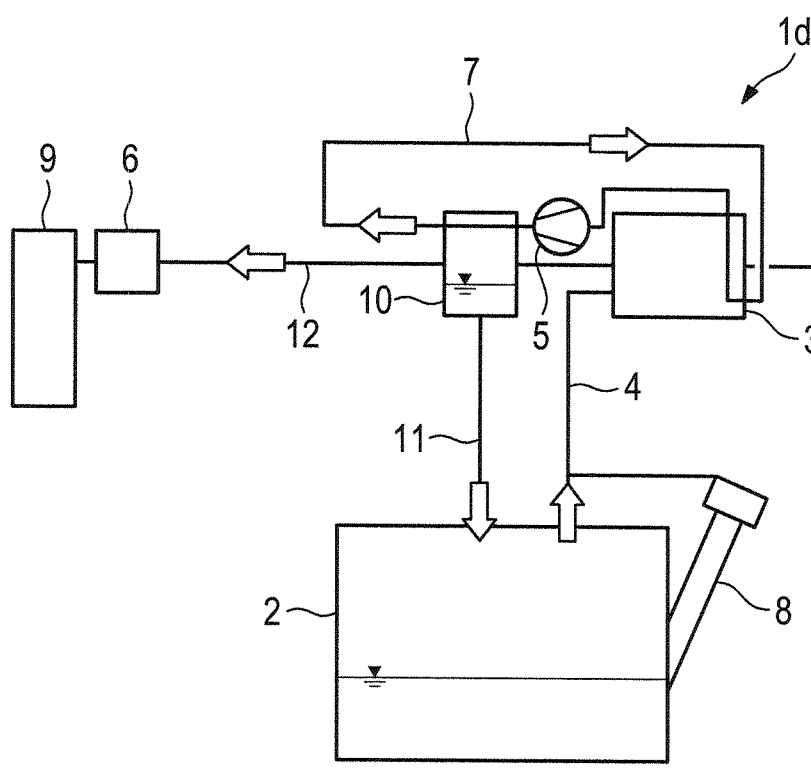
FIG. 4 is a schematic circuit diagram of a fourth illustrative embodiment of the fuel system according to the invention.
Figure 5:
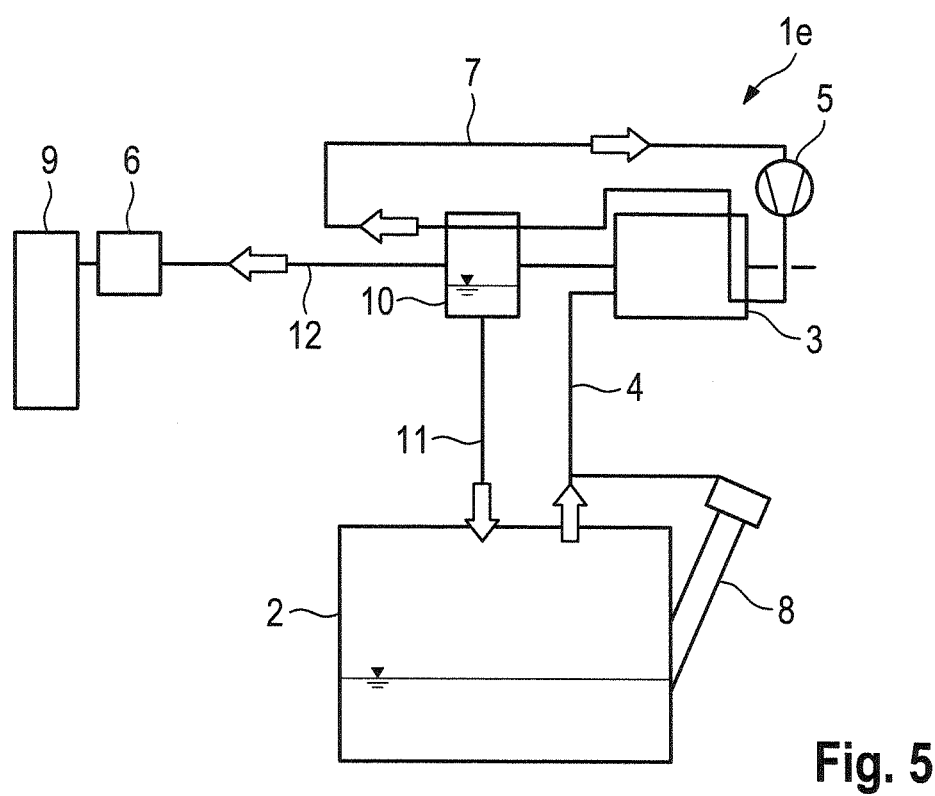
FIG. 5 is a schematic circuit diagram of a fifth illustrative embodiment of the fuel system according to the invention.

FIG. 4 shows a fuel system 1d with a different course of the fresh air stream 7 as compared with the fuel system 1c shown in FIG. 3. FIG. 5 shows a fuel system 1e corresponding to the fuel system 1c shown in FIG. 4, but with the pump unit 5 in a different position. In the fuel system 1e shown in FIG. 5, the pump unit 5 is arranged ahead of the activated carbon filter 3. In other respects, the construction of the fuel system 1e shown in FIG. 5 corresponds to that of the fuel system 1d shown in FIG. 4.

Figure 6:
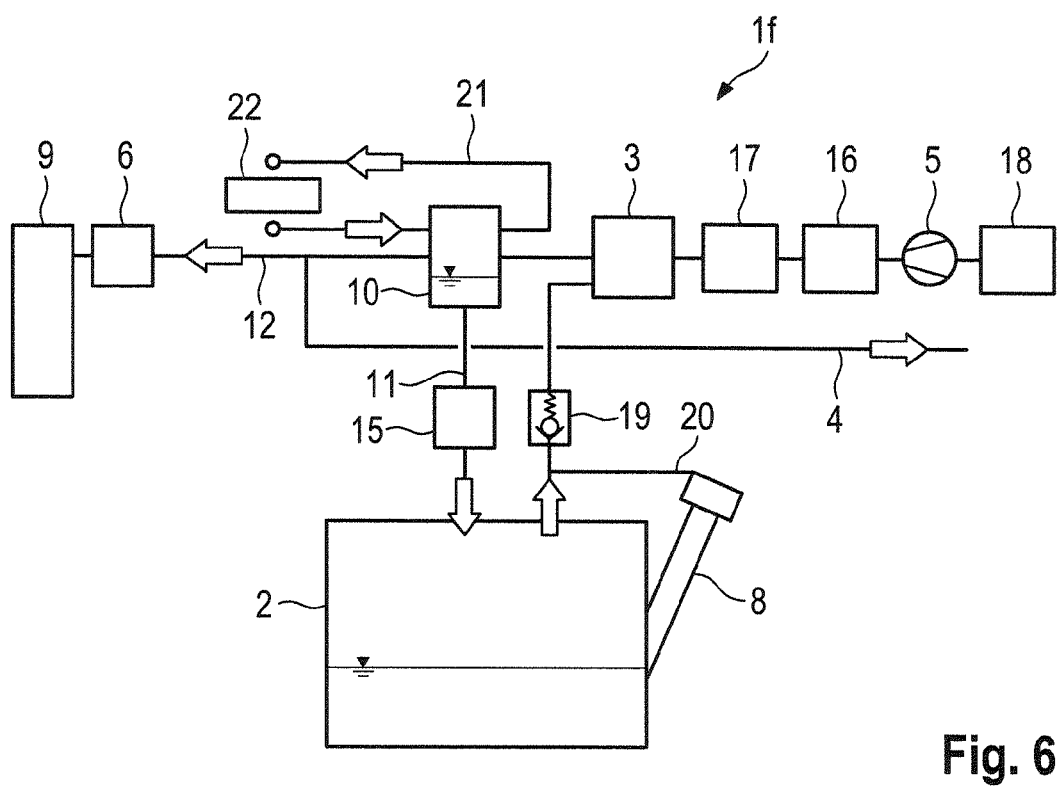
FIG. 6 is a schematic circuit diagram of a sixth illustrative embodiment of the fuel system according to the invention.

FIG. 6 shows a fuel system 1f comprising a fuel tank 2, an activated carbon filter 3, a venting path 4, a pump unit 5, a tank venting valve 6, a tank filler neck 8, an engine 9, a condenser 10, a return line 11 with an integrated temporary store 15, a heater 16, a diagnostic module 17, a filter 18, a tank protection device 19, a diagnostic line 20 and a cooling section 21 with a cooling module 22. The construction of the fuel system 1f falls within the same general inventive concept as the fuel systems 1a, 1b, 1c, 1d, 1e shown in FIG. 1 to FIG. 5.

The diagnostic module 17 and the diagnostic line 20 of the fuel system 1f offer the possibility of purging operations that can be carried out in accordance with states of loading of the activated carbon filter 3. By way of example, the pump unit 5 is switched off when the activated carbon filter 3 has been purged sufficiently. Alternatively, the pump unit 5 is switched on when the activated carbon filter exceeds a certain loading, e.g. to avoid or delay penetration of the activated carbon filter.

What is claimed is:

1. A fuel system for a hybrid motor vehicle having an internal combustion engine, comprising:
    a fuel tank;
    a fuel vapor venting path communicating with the fuel tank and containing an activated carbon filter;
    a purging path extending from the activated carbon filter to the internal combustion engine;
    a tank ventilating valve in the purging path between the activated carbon filter and the internal combustion engine;
    a condenser unit in the purging path between the activated carbon filter and the tank ventilating valve;
    a return line extending from the condenser unit to the fuel tank;
    an independent pump unit arranged close to the activated carbon filter and operative to urge a stream of fresh air through at least a periphery of the activated carbon filter and toward the tank venting valve to regenerate said filter; and
    a control unit connected at least to the pump, the condenser unit and the tank venting valve, the control unit being operative to operate the pump and the tank ventilating valve to purge the activated carbon filter under specified load states of the activated carbon filter when the internal combustion engine is operating and to operate the pump and the condenser unit to purge the activated carbon filter under specified load states of the activated carbon filter when the internal combustion engine is not operating.

2. The fuel system of claim 1, wherein the condenser unit is configured to cool a mixture of air and fuel vapor emerging from the activated carbon filter to produce a fuel fraction that can be removed by condensation.

3. The fuel system of claim 2, wherein the pump unit is arranged as a compressor on a fresh air side of the activated carbon filter or as a suction device on an internal combustion engine side between the internal combustion engine and the activated carbon filter.

4. The fuel system of claim 2, wherein a volume flow of the pump unit is made to depend on variables relevant to a state of regeneration of the activated carbon filter for open-loop or closed-loop control.

5. The fuel system of claim 4, wherein the control unit is operative for activating the pump unit while the vehicle is in operation and when the vehicle is stationary.

6. The fuel system of claim 4, wherein the control unit is operative for activating the pump unit only when the vehicle is stationary or only when the vehicle is in operation.

7. The fuel system of claim 2, further comprising a temporary store in the return line for the condensed fuel fraction from the condenser unit to the fuel tank.

8. The fuel system of claim 2, wherein the pump unit comprises an electric vane cell pump.

* * * * *